(12) United States Patent
Guleryuz et al.

(10) Patent No.: US 12,432,383 B2
(45) Date of Patent: Sep. 30, 2025

(54) TRANSFORM PREDICTION WITH PARSING INDEPENDENT CODING

(71) Applicant: GOOGLE LLC, Mountain View, CA (US)

(72) Inventors: Onur Guleryuz, San Francisco, CA (US); Zeyu Deng, Santa Barbara, CA (US); Debargha Mukherjee, Cupertino, CA (US); Lester Lu, Los Angeles, CA (US); Yue Chen, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 37 days.

(21) Appl. No.: 18/542,850

(22) Filed: Dec. 18, 2023

(65) Prior Publication Data

US 2024/0205458 A1 Jun. 20, 2024

Related U.S. Application Data

(60) Provisional application No. 63/433,800, filed on Dec. 20, 2022.

(51) Int. Cl.
*H04N 19/61* (2014.01)
*H04N 19/105* (2014.01)
(Continued)

(52) U.S. Cl.
CPC ........... *H04N 19/61* (2014.11); *H04N 19/105* (2014.11); *H04N 19/12* (2014.11); *H04N 19/124* (2014.11);
(Continued)

(58) Field of Classification Search
CPC .... H04N 19/105; H04N 19/12; H04N 19/124; H04N 19/13; H04N 19/172; H04N 19/176; H04N 19/42; H04N 19/61; H04N 19/70
See application file for complete search history.

(56) References Cited

U.S. PATENT DOCUMENTS 9,565,451 B1 * 2/2017 Mukherjee ........... H04N 19/117
2018/0007361 A1 * 1/2018 Mukherjee ........... H03M 7/4006
(Continued)

*Primary Examiner* — Jessica M Prince
(74) *Attorney, Agent, or Firm* — Young Basile Hanlon & MacFarlane, P.C.

(57) ABSTRACT

Transform prediction with parsing independent coding includes generating a reconstructed frame and outputting the reconstructed frame. Generating the reconstructed frame includes entropy decoding transform blocks for the reconstructed frame, entropy decoding decoded transform identifiers for the transform blocks, obtaining transform-specific probability distributions for available transforms, and, for a current transform block from the transform blocks, identifying a current remapped transform identifier from the decoded transform identifiers, identifying a current transform identifier in accordance with the current remapped transform identifier, the transform coefficients from the current transform block, and the transform-specific probability distributions, identifying a current transform in accordance with the current transform identifier; inverse transforming, in accordance with the current transform, the current transform block to obtain a current residual block and obtaining a current reconstructed block using the current residual block. Generating the reconstructed frame includes including the current reconstructed block in the reconstructed frame.

20 Claims, 8 Drawing Sheets

(51) Int. Cl.
*H04N 19/12* (2014.01)
*H04N 19/124* (2014.01)
*H04N 19/13* (2014.01)
*H04N 19/172* (2014.01)
*H04N 19/176* (2014.01)
*H04N 19/42* (2014.01)
*H04N 19/70* (2014.01)

(52) U.S. Cl.
CPC ........... *H04N 19/13* (2014.11); *H04N 19/172* (2014.11); *H04N 19/176* (2014.11); *H04N 19/42* (2014.11); *H04N 19/70* (2014.11)

(56) References Cited

U.S. PATENT DOCUMENTS

2018/0070106 A1* 3/2018 Han .................... H04N 19/134
2019/0058883 A1* 2/2019 Chiang ................ H04N 19/13

* cited by examiner

TRANSFORM PREDICTION WITH PARSING INDEPENDENT CODING

CROSS-REFERENCE TO RELATED APPLICATION(S)

This application claims priority to and the benefit of U.S. Provisional Application Patent Ser. No. 64/433,800, filed Dec. 20, 2022, the entire disclosure of which is hereby incorporated by reference.

BACKGROUND

Digital images and video can be used, for example, on the internet, for remote business meetings via video conferencing, high-definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth.

SUMMARY

This application relates to encoding and decoding of image data, video stream data, or both for transmission, storage, or both. Disclosed herein are aspects of systems, methods, and apparatuses for transform prediction with parsing independent coding for image and video coding.

An aspect is a method for decoding using transform prediction with parsing independent coding. Decoding using transform prediction with parsing independent coding includes obtaining an encoded bitstream, generating a reconstructed frame, wherein the reconstructed frame includes a plurality of blocks, and outputting the reconstructed frame. Generating the reconstructed frame includes entropy decoding, from the encoded bitstream, transform blocks for the reconstructed frame, entropy decoding, from the encoded bitstream, decoded transform identifiers for the transform blocks, and obtaining transform-specific probability distributions for available transforms. Generating the reconstructed frame includes, for a current transform block from the transform blocks, identifying a current remapped transform identifier from the decoded transform identifiers, identifying a current transform identifier, wherein identifying the current transform identifier includes identifying the current transform identifier in accordance with the current remapped transform identifier, the transform coefficients from the current transform block, and the transform-specific probability distributions, identifying a current transform in accordance with the current transform identifier, inverse transforming, in accordance with the current transform, the current transform block to obtain a current residual block, and obtaining a current reconstructed block using the current residual block. Generating the reconstructed frame includes including the current reconstructed block in the reconstructed frame.

Another aspect is a method for encoding using transform prediction with parsing independent coding. Encoding using transform prediction with parsing independent coding includes obtaining a current frame from an input video stream and obtaining an encoded frame by encoding the current frame. Encoding the current frame includes, for a current block from the current frame, obtaining, as a residual block, a difference between the current block and a prediction reference block obtained for coding the current block, determining a transform identifier of a transform, from a plurality of available transforms, for transforming the residual block, obtaining an entropy coded block by entropy coding a transform block obtained by transforming the residual block using the transform, including the entropy coded block in a plurality of entropy coded blocks for the current frame, obtaining a transform-specific probability distribution for the transform, obtaining an entropy coded transform identifier by entropy coding the transform identifier using the transform-specific probability distribution, and including the entropy coded transform identifier in a plurality of entropy coded transform identifiers for the current frame. Encoding using transform prediction with parsing independent coding includes including the plurality of entropy coded blocks in an output bitstream, including the plurality of entropy coded transform identifiers in the output bitstream, and outputting the output bitstream.

Another aspect is an apparatus for decoding using transform prediction with parsing independent coding. The apparatus includes a non-transitory computer readable medium and a processor configured to execute instructions stored on the non-transitory computer readable medium to obtain an encoded bitstream and generate a reconstructed frame, wherein the reconstructed frame includes a plurality of blocks. To generate the reconstructed frame, the processor executes the instructions to entropy decode, from the encoded bitstream, transform blocks for the reconstructed frame, entropy decode, from the encoded bitstream, decoded transform identifiers for the transform blocks, and obtain transform-specific probability distributions for available transforms. To generate the reconstructed frame, the processor executes the instructions to, for a current transform block from the transform blocks, identify a current remapped transform identifier from the decoded transform identifiers and identify a current transform identifier. To identify the current transform identifier, the processor executes the instructions to identify the current transform identifier in accordance with the current remapped transform identifier, the transform coefficients from the current transform block, and the transform-specific probability distributions. To generate the reconstructed frame, the processor executes the instructions to, for a current transform block from the transform blocks, identify a current transform in accordance with the current transform identifier, inverse transform, in accordance with the current transform, the current transform block to obtain a current residual block, and obtain a current reconstructed block in accordance with the current residual block. To generate the reconstructed frame, the processor executes the instructions to include the current reconstructed block in the reconstructed frame and output the reconstructed frame.

Another aspect is an apparatus for encoding using transform prediction with parsing independent coding. The apparatus includes a non-transitory computer readable medium and a processor configured to execute instructions stored on the non-transitory computer readable medium to obtain a current frame from an input video stream, and obtain an encoded frame. To obtain the encoded frame the processor executes the instructions to encode the current frame. To encode the current frame the processor executes the instructions to, for a current block from the current frame, obtain as a residual block, a difference between the current block and a prediction reference block obtained for coding the current block, determine a transform identifier of a transform, from a plurality of available transforms, for transforming the residual block, obtain an entropy coded block, wherein, to obtain the entropy coded block, the processor executes the instructions to entropy code a transform block obtained by transformation of the residual block using the transform, include the entropy coded block in a plurality of entropy coded blocks for the current frame, obtain a transform-specific probability distribution for the transform, obtain an entropy coded transform identifier, wherein to obtain the entropy coded transform identifier the processor executes the instructions to entropy code the transform identifier using the transform-specific probability distribution, and include the entropy coded transform identifier in a plurality of entropy coded transform identifiers for the current frame. The processor is configured to include the plurality of entropy coded blocks in an output bitstream, include the plurality of entropy coded transform identifiers in the output bitstream, and output the output bitstream.

Another aspect is a non-transitory computer-readable storage medium having stored thereon an encoded bitstream, wherein the encoded bitstream is configured to facilitate decoding by operations comprising obtaining an encoded bitstream, generating a reconstructed frame, wherein the reconstructed frame includes a plurality of blocks, and outputting the reconstructed frame. Generating the reconstructed frame includes entropy decoding, from the encoded bitstream, transform blocks for the reconstructed frame, entropy decoding, from the encoded bitstream, decoded transform identifiers for the transform blocks, and obtaining transform-specific probability distributions for available transforms. Generating the reconstructed frame includes, for a current transform block from the transform blocks, identifying a current remapped transform identifier from the decoded transform identifiers, identifying a current transform identifier, wherein identifying the current transform identifier includes identifying the current transform identifier in accordance with the current remapped transform identifier, the transform coefficients from the current transform block, and the transform-specific probability distributions, identifying a current transform in accordance with the current transform identifier, inverse transforming, in accordance with the current transform, the current transform block to obtain a current residual block, and obtaining a current reconstructed block using the current residual block. Generating the reconstructed frame includes including the current reconstructed block in the reconstructed frame.

Another aspect is a non-transitory computer-readable storage medium having stored thereon an encoded bitstream, the encoded bitstream generated by performing operations comprising obtaining a current frame from an input video stream and obtaining an encoded frame by encoding the current frame. Encoding the current frame includes, for a current block from the current frame, obtaining, as a residual block, a difference between the current block and a prediction reference block obtained for coding the current block, determining a transform identifier of a transform, from a plurality of available transforms, for transforming the residual block, obtaining an entropy coded block by entropy coding a transform block obtained by transforming the residual block using the transform, including the entropy coded block in a plurality of entropy coded blocks for the current frame, obtaining a transform-specific probability distribution for the transform, obtaining an entropy coded transform identifier by entropy coding the transform identifier using the transform-specific probability distribution, and including the entropy coded transform identifier in a plurality of entropy coded transform identifiers for the current frame. Encoding using transform prediction with parsing independent coding includes including the plurality of entropy coded blocks in an output bitstream, including the plurality of entropy coded transform identifiers in the output bitstream, and outputting the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients (e.g., energy compaction), quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information. In some implementations, the accuracy, efficiency, or both, of coding a block using either inter-prediction or intra-prediction may be limited.

To utilize temporal redundancies and maximize compression efficiency, a codec generates a residual block using the current block to be encoded and its prediction reference block. The residual block is then transformed, quantized, and entropy encoded. The encoder signals the transform via a transform identifier (transform ID). The decoder decodes the transform identifier and performs transform decoding operation using the transform indicated by the transform identifier.

The techniques described herein improve coding efficiency by omitting, or excluding, signaling the transform identifier. The decoder obtains, or derives, the transform identifier based on the characteristics of the available transforms and the quantized transform coefficients received from the encoder. In some implementations, the quantized transform coefficients are encoded before the transform identifier in the bitstream, such that the decoder may decode the coefficients and conditionally decode transform identifiers based on the decoded coefficients, which is block-parsing-independent. For example, the decoder can decode the coefficients of the blocks of the frame, and subsequently decode the transform identifiers of the blocks. In some implementations, the transform coefficients and the transform identifiers may be decoded separately, independently, and asynchronously, such as in parallel, which is block-parsing-independent.

Figure 1:
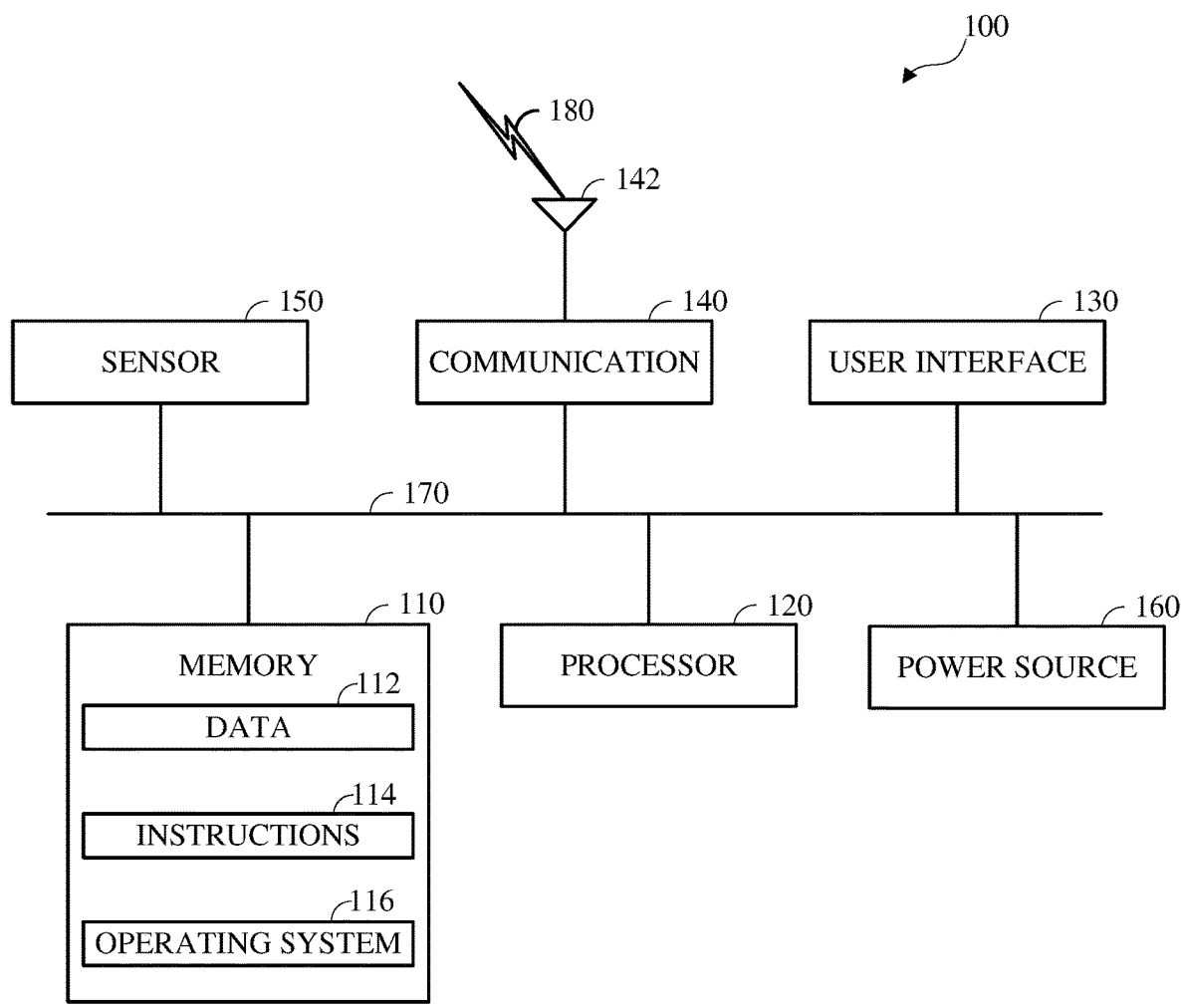
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
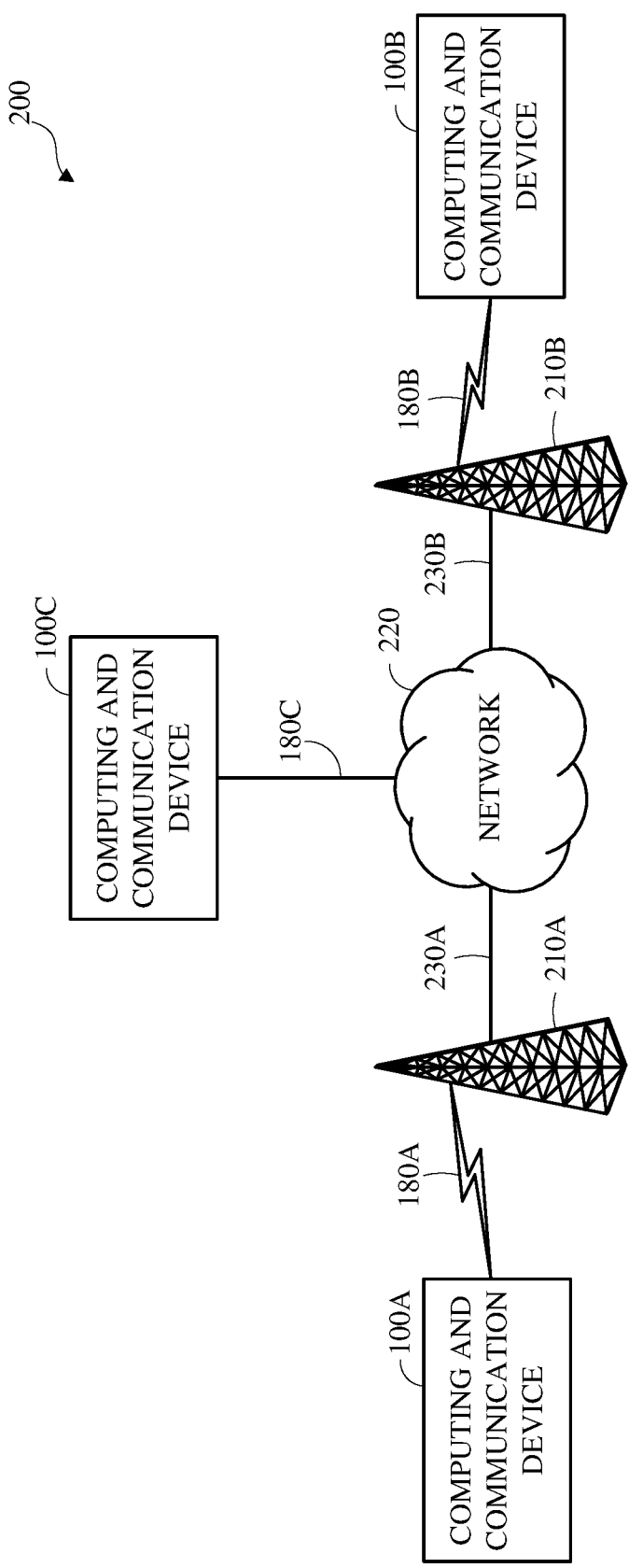
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some, or all, of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VOIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
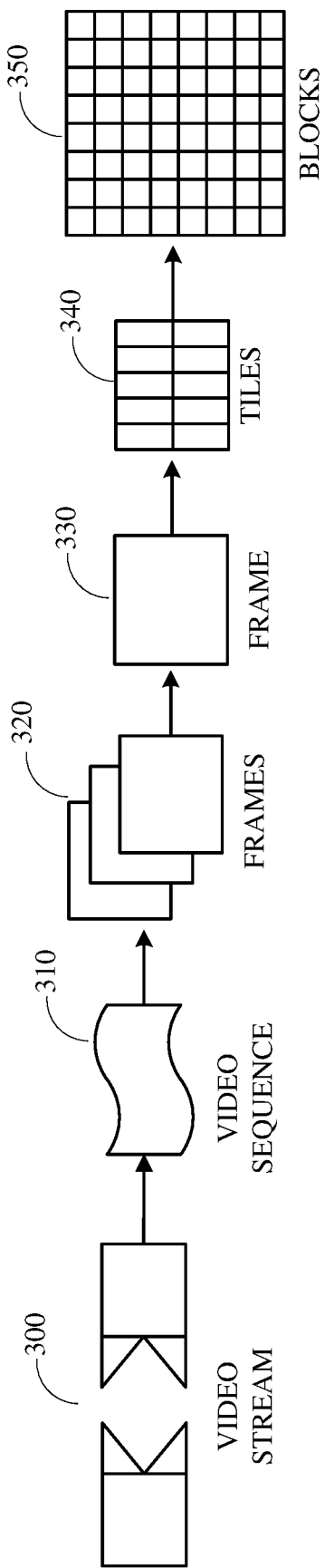
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
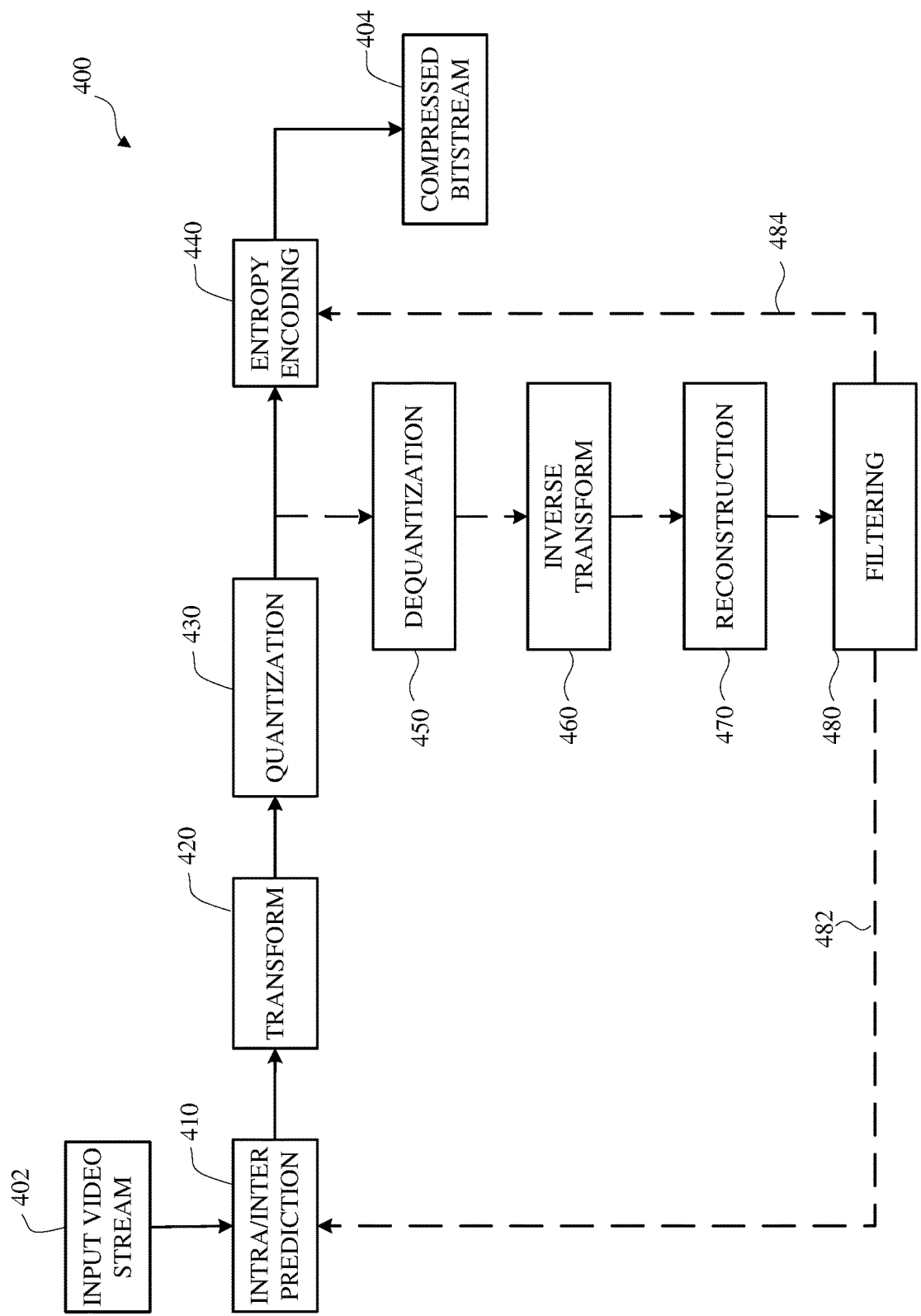
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
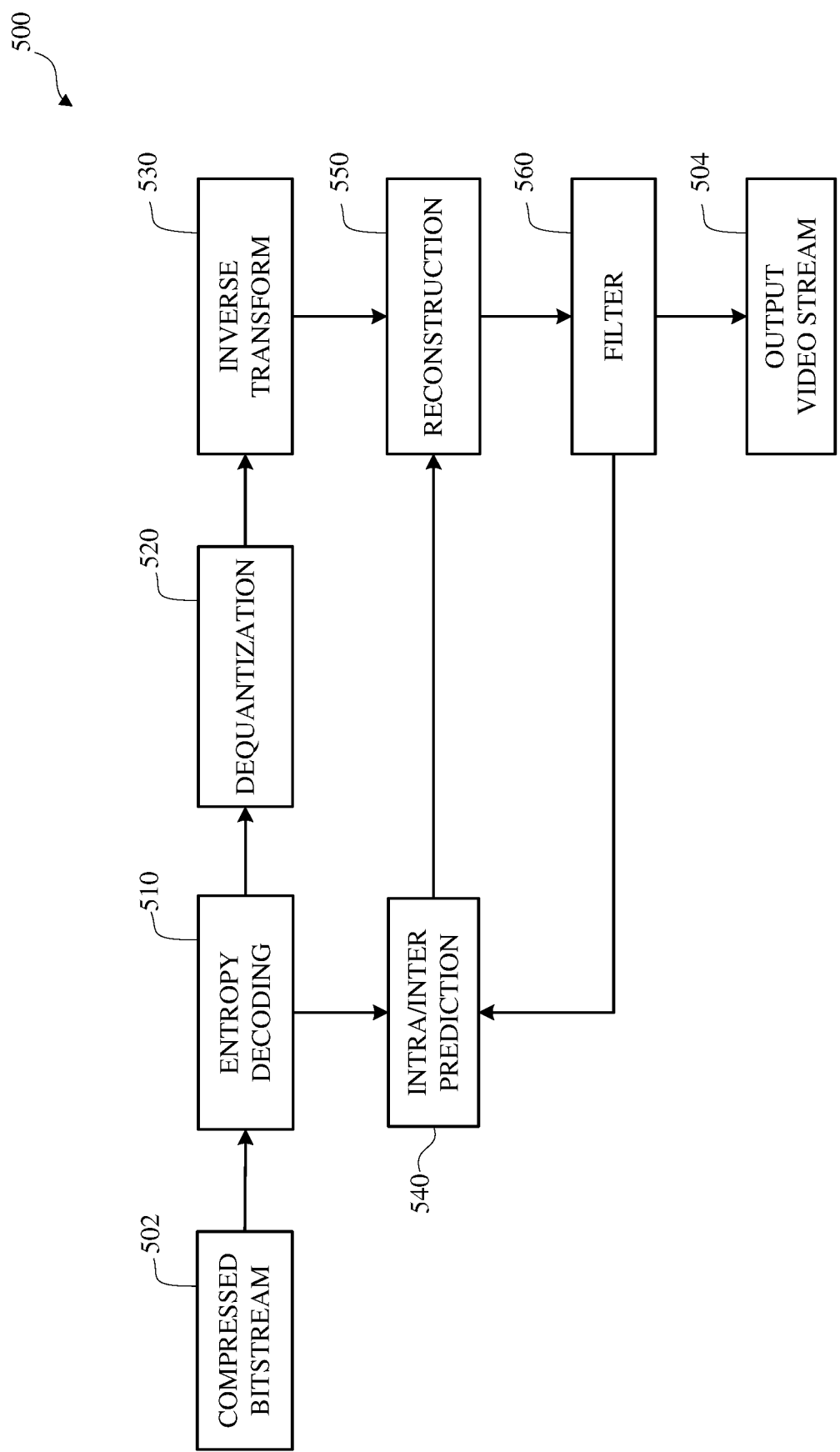
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
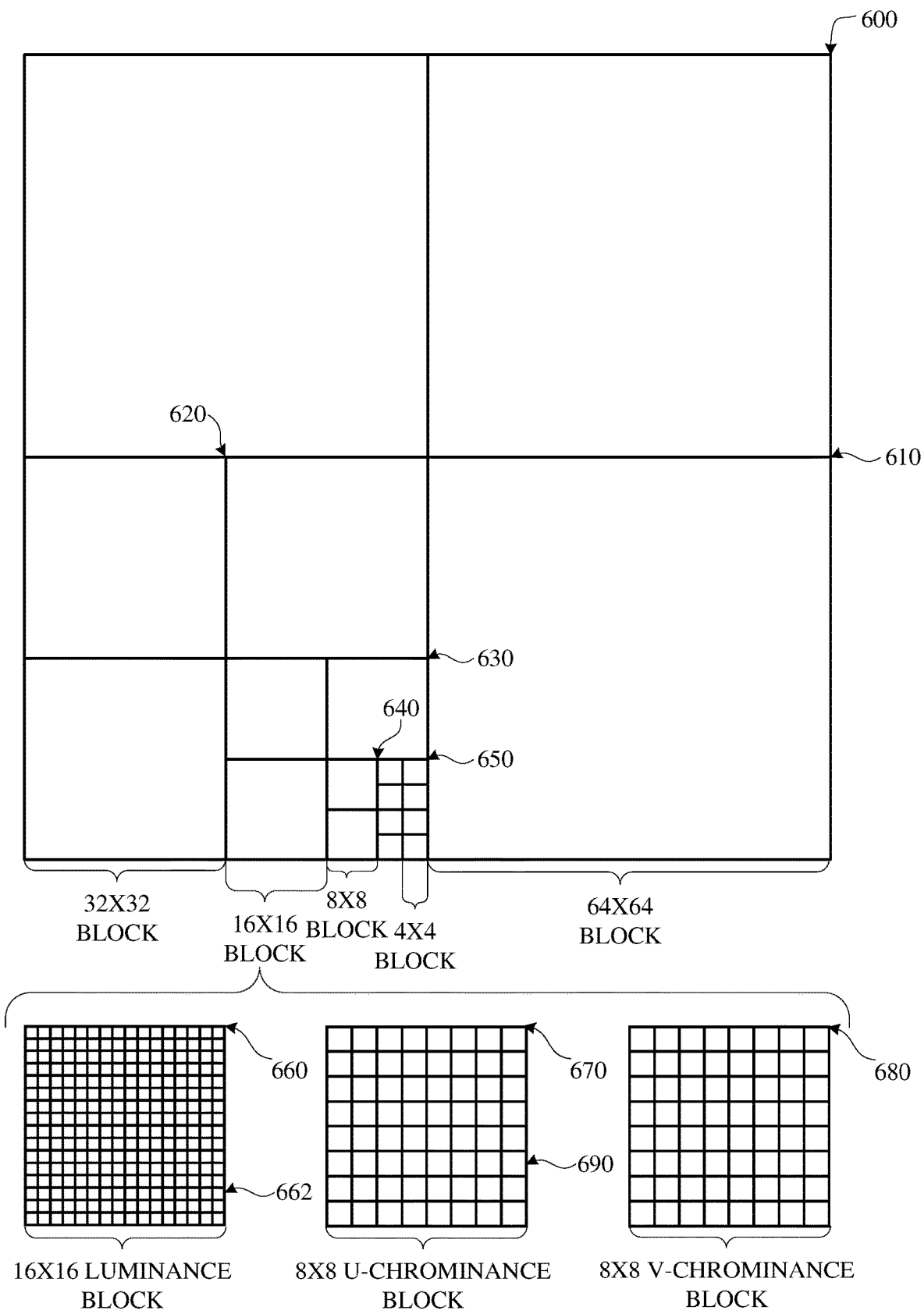
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
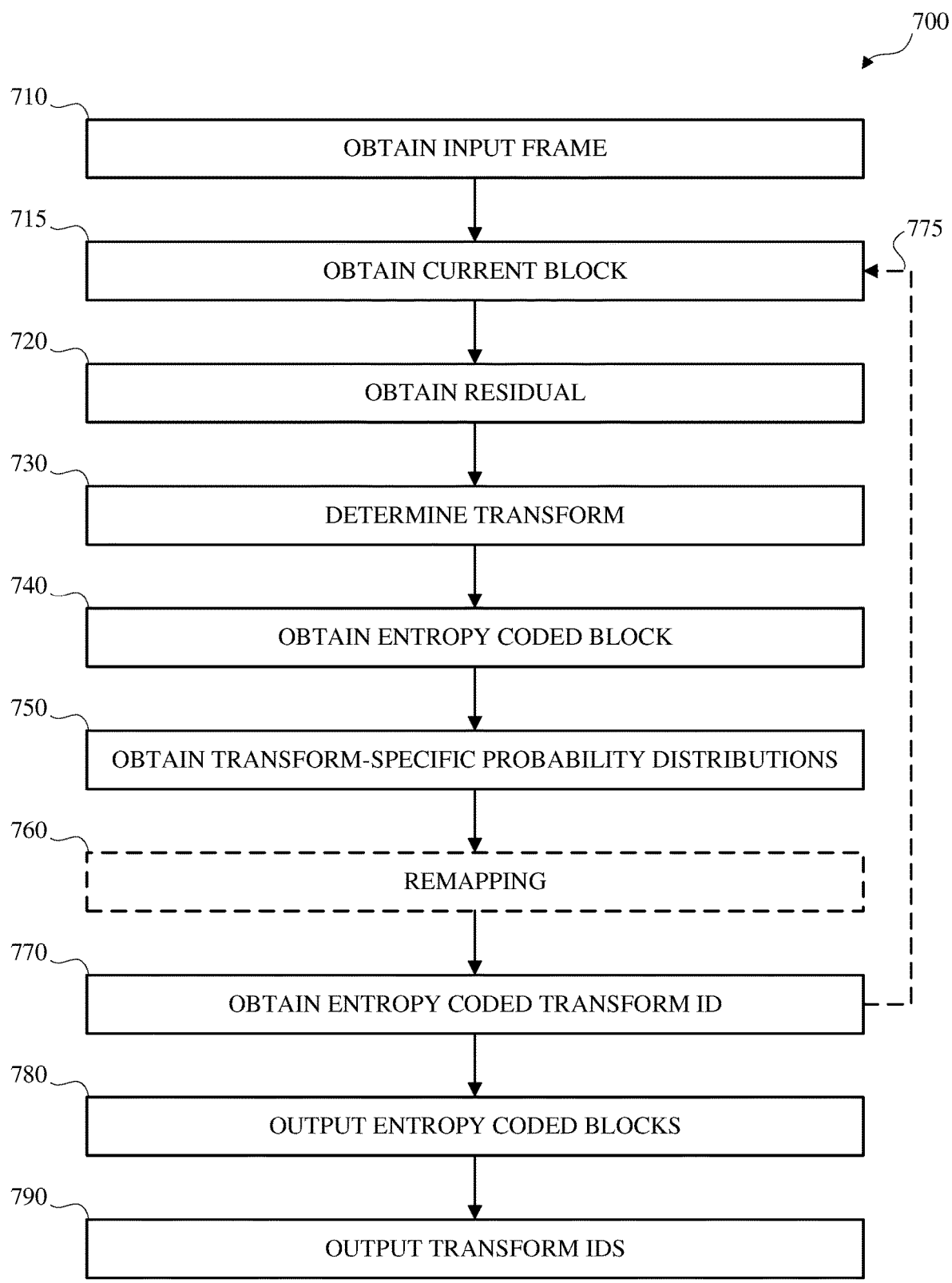
FIG. 7 is a block diagram of an example of a method of transform prediction with parsing independent encoding in accordance with implementations of this disclosure.

FIG. 7 is a block diagram of an example of a method of transform prediction with parsing independent encoding 700 in accordance with implementations of this disclosure. Transform prediction with parsing independent encoding 700 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. Transform prediction with parsing independent encoding 700 can be implemented as specialized hardware included, for example, in computing device 100. For example, an encoder, such as the encoder 400 shown in FIG. 4, or one or more components thereof, may implement transform prediction with parsing independent encoding 700, or one or more portions thereof.

As shown in FIG. 7, transform prediction with parsing independent encoding 700 includes obtaining an input frame (at 710), obtaining a current block (at 715), obtaining a residual (at 720), determining a transform (at 730), obtaining an entropy coded block (at 740), obtaining transform-specific probability distributions (at 750), remapping (at 760), obtaining an entropy coded transform identifier (ID) (at 770), outputting entropy coded blocks (at 780), and outputting transform identifiers (at 790).

The input frame (current frame) is obtained (at 710) from a source, such as an input video. The current frame is a frame from the input video, or input video stream. In some implementations, the input video stream may include one or more sequences of frames. A sequence of frames may have a defined cardinality, or number, of frames. For example, the encoder, or a component thereof, such as an intra/inter prediction unit of the encoder, such as the intra/inter prediction unit 410 shown in FIG. 4, may obtain the input video stream. The current frame may be obtained (at 710) subsequent to encoding one or more other frames, such as a frame sequentially preceding the current frame in the input video stream, and generating, or otherwise obtaining, a corresponding reconstructed frame (or frames), or one or more portions thereof, for use as a reference frame (or frames) for encoding the current frame. The current block is obtained (at 715) from the current frame. For example, the current block may be a block, such as block 630 shown in FIG. 6. The current block may be obtained, or identified, according to a block scan order. In some implementations, obtaining the current block (at 720) may include obtaining, or identifying, a tile from the input frame and obtaining, or identifying, the current block from the tile. Although obtaining the current block is described with reference to forward raster scan order, another block scan order may be used.

The residual, or residual block, is obtained (at 720). Obtaining the residual block (at 720) includes obtaining a prediction reference block. For example, the encoder, or a component thereof, such as a prediction unit, such as the intra/inter prediction unit 410 shown in FIG. 4, may generate, or otherwise obtain, the prediction reference block (prediction block, predictor block, block prediction) using intra prediction, inter prediction, or a combination thereof.

The residual block is obtained using the prediction reference block. For example, the encoder, or a component thereof, such as the prediction unit, may determine, or compute, a difference between the prediction reference block and the current block as the residual block, such as by subtracting the prediction reference block from the current block.

The transform, a corresponding transform identifier, or both, is determined (at 730) for transforming the residual block. The transform, which may be a linear transform, may be identified from one or more available, or candidate, transforms. For example, the residual block may be a 4×4 or an 8×8 block and the number, or cardinality, of available transforms ($N_T$) for transforming the residual block may be sixteen ($N_T=16$). Determining, identifying, or otherwise obtaining, the transform (at 730) includes determining, identifying, or otherwise obtaining, a transform identifier (transform ID) for the transform, such as an integer value in a range from zero to fifteen (0-15). For example, the encoder may access a list, table, map, or other data structure, mapping, or associating, the respective transforms with corresponding transform identifiers.

For example, a transform identifier of zero (0) may indicate a discrete cosign transform horizontally and vertically, a transform identifier of one (1) may indicate an asymmetric discrete sine transform horizontally and a discrete cosign transform vertically, a transform identifier of two (2) may indicate a discrete cosign transform horizontally and an asymmetric discrete sine transform vertically, a transform identifier of three (3) may indicate an asymmetric discrete sine transform horizontally and vertically, a transform identifier of four (4) may indicate a flipped asymmetric discrete sine transform horizontally and a discrete cosign transform vertically, a transform identifier of five (5) may indicate a discrete cosign transform horizontally and a flipped asymmetric discrete sine transform vertically, a transform identifier of six (6) may indicate a flipped asymmetric discrete sine transform horizontally and vertically, a transform identifier of seven (7) may indicate an asymmetric discrete sine transform horizontally and a flipped asymmetric discrete sine transform vertically, a transform identifier of eight (8) may indicate a flipped asymmetric discrete sine transform horizontally and an asymmetric discrete sine transform vertically, a transform identifier of nine (9) may indicate an identity transform, a transform identifier of ten (10) may indicate a discrete cosign transform vertically, a transform identifier of eleven (11) may indicate a discrete cosign transform horizontally, a transform identifier of twelve (12) may indicate an asymmetric discrete cosign transform vertically, a transform identifier of thirteen (13) may indicate an asymmetric discrete cosign transform horizontally, a transform identifier of fourteen (14) may indicate a flipped asymmetric discrete cosign transform vertically, and a transform identifier of fifteen (15) may indicate a flipped asymmetric discrete cosign transform horizontally. Other transforms and other orders may be used.

The encoder, such as a transform component of the encoder, such as the transform unit 420 shown in FIG. 4, identifies the rate-distortion optimal available transform, such as the transform that corresponds with minimal distortion, such as quantization error, which may include determining a number, or cardinality, of bits for entropy coding the corresponding quantized block. Determining the transform (at 730) may include using, such as statistically, characteristics of the respective transforms, such as the independence of the coefficients and the energy compactness.

The entropy coded block is obtained (at 740). Obtaining the entropy coded block includes obtaining a transform block (block of transform coefficients) by applying the transform (identified at 730) to the residual block (obtained at 720). The transform block includes transform coefficients. In some implementations, the residual block size may be greater than the transform block size and multiple transform blocks may be obtained, which may include identifying a respective transform (at 730) for the respective transform blocks. In some implementations, the transform block size may be greater than the residual block size, and the transform block may be obtained for multiple residual blocks.

Obtaining the entropy coded block (at 740) includes obtaining a quantized block by quantizing the transform block. The quantized block includes quantized transform coefficients obtained by quantizing transform coefficients from the transform block. Although described separately herein, in some implementations, transformation and quantization may be combined.

Obtaining the entropy coded block (at 740) includes obtaining the entropy coded block by entropy coding the quantized block. The entropy coded block includes entropy coded quantized transform coefficients.

Although not shown separately in FIG. 7, obtaining the entropy coded block (at 740) may include obtaining an entropy decoded transform block, including entropy decoded transform coefficients. Obtaining the entropy decoded transform block may include dequantizing the entropy decoded quantized transform coefficients.

The transform-specific probability distributions are obtained (at 750). The transform-specific probability distributions include, on a per-transform basis, respective, transform-specific, probability distributions generated, or otherwise obtained, for the available transforms ($N_T$). The transform-specific probability distributions may be generated, or otherwise obtained, prior to transform prediction with parsing independent encoding 700. For example, obtaining the transform-specific probability distributions (at 750) may include reading, or otherwise accessing, the transform-specific probability distributions, or a portion thereof, from previously stored data.

The transform-specific probability distributions are generated, or otherwise obtained, in accordance with, or using, training data, such as previously coded image data, previously coded image data video data, or a combination thereof.

In some implementations, the transform-specific probability distributions may be obtained in accordance with, or using, transform domain training data. The available transforms ($N_T$) use different bases to fit for residual blocks and may be distinguishable in accordance with the respective probability distributions of transform coefficients, from the training data, generated, or otherwise obtained, using the respective transforms. The training data may be used to determine statistical coefficient distributions (transform-specific probability distributions) for the available transforms ($N_T$) in accordance with one or more probability models, such as a Gaussian probability model, a Laplacian probability model, or a Generalized-Gaussian probability model.

Statistical quantities, such as the means and the variances, of transform coefficients obtained using the respective available transforms ($N_T$) may be obtained, or collected, based on the independence assumption from the training data. In some implementations, for relatively high complexity, the independence assumption may be relaxed, and covariance statistics may be determined.

Obtaining the probability (p), such as for independent Gaussian distributions, for a vector of the block coefficients (c) for the current block having a size (d), such as sixty-four for an 8×8 block, for a variance ($\sigma_{Ti}$) and a mean ($\mu_{Ti}$) trained for the i-th coefficient of the transform, or transform type, (T), may be expressed as the following:

[Equation 1]
$$p(c \mid T) = \prod_{i=0}^{d-1} p(c_i \mid \mu_{Ti}, \sigma_{Ti}) = \prod_{i=0}^{d-1} \frac{1}{\sqrt{2\pi}\,\sigma_{Ti}} \exp\left(-\frac{1}{2\sigma_{Ti}^2}(c_i - \mu_{Ti})^2\right).$$

In another example, obtaining the probability (p), wherein the distribution can include covariances trained for the transform, or transform type, (T), wherein the mean vector ($\mu_T$) and the covariance matrix ($\Sigma_T$) for transform type T are obtained from the training set, may be expressed as the following:

[Equation 2]
$$p(c \mid T) = \frac{1}{(2\pi)^{d/2}|\Sigma_T|^{1/2}} \exp\left(-\frac{1}{2}(c - \mu_T)^t \Sigma_T^{-1}(c - \mu_T)\right).$$

The distribution model can be generalized to Laplacian or other distributions.

In some implementations, obtaining the transform-specific probability distributions includes obtaining updated transform-specific probability distributions, or a respective updated mean thereof, for the available transforms by updating the transform-specific probability distributions in accordance with corresponding prediction reference blocks from the training data. Transform coefficients for the respective prediction reference blocks can be used to update the estimated mean from the training set to generate a conditional mean for the coefficients, conditioned on the reference block. One or more linear projections may be evaluated over the prediction reference block. A respective linear projection may introduce a coefficient for the reference block. The linear projections are determined using training over the training data. In some implementations, one or more basis functions, such as the DC and the first AC basis functions, from a respective transform, such as DCT, DST, etc., may be used.

For example, obtaining the probability (p), using the prediction reference block (R), and using the i-th coefficient of the transform block obtained using the transform (T) as the estimated mean for the i-th coefficient of the residual block ($C_{rTi}$), may be expressed as the following:

[Equation 3]
$$p(c \mid T, R) = \prod_{i=0}^{d-1} p(c_i \mid c_{rTi}, \sigma_{Ti}) = \prod_{i=0}^{d-1} \frac{1}{\sqrt{2\pi}\,\sigma_{Ti}} \exp\left(-\frac{1}{2\sigma_{Ti}^2}(c_i - c_{rTi})^2\right).$$

The quantities collected, combined with the distribution model (Gaussian, Laplacian, etc.), may be used to determine the conditional probability for a respective available transform (transform candidate) for the current block. The probabilities of the available transforms ($N_T$) for the current block may be obtained, such as using the Bayes' theorem, together with empirical priori probabilities of the transform types collected. For example, obtaining the probability (p) for the current block, wherein the empirical priori probability p(T) is independent of the reference block (R), may be expressed as the following:

$$p(T \mid c) = \frac{p(c \mid T)p(T)}{\sum_{T=0}^{N_T} p(c \mid T)p(T)} \text{ or } p(T \mid c, R) = \frac{p(c \mid T, R)p(T)}{\sum_{T=0}^{N_T} p(c \mid T, R)p(T)}.$$

The term $\sum_{T=0}^{N_T} p(c \mid T, R)p(T)$ may be a constant for a respective vector of block coefficients (c).

In some implementations, obtaining the probability (p) may include using a log function, which may be expressed as the following:

$$\log(p(c \mid T)) = \log\left(\prod_{i=0}^{d-1} p(c_i \mid \mu_{Ti}, \sigma_{Ti})\right) = \sum_{i=0}^{d-1} \log(p(c_i \mid \mu_{Ti}, \sigma_{Ti})).$$

In some implementations, the optimal set of coefficients used (δ) may be less that the set of available coefficients (d), δ≤d, terms in the likelihood may be obtained via optimization, which may reduce complexity. Optimization can determine which coefficients to include in the reduced optimal set of coefficients used (δ).

In some implementations, other coefficients may be obtained from the reference block, wherein the reference block includes a set of transform coefficients (r), by applying a trained linear transformation, which may be expressed as the following:

$$p(c \mid T, R) \Rightarrow p(c, r \mid T, R).$$

In some implementations, the likelihoods may be determined prior to coding the current block and stored as a number, or cardinality, (d) lookup tables (LUT), wherein a respective lookup table is obtained in accordance with likelihood values for a set of discretized coefficient vectors (c), which may be expressed as the following:

$$LUT[i, j] = \log(p(c_i^j \mid \mu_{Ti}, \sigma_{Ti})).$$

In such implementations, the likelihood may be determined by summing the appropriate lookup table values (LUT[i,j]). In some implementations, calculating p(T|c) is omitted and p(T|f(c)) is used by applying a function (f) on the coefficient vector (c). For example, the function (f) may be the number, or cardinality, of non-zero values in the coefficient vector (c). In another example, the function (f) may be a number calculated using a binary representation of components of the coefficient vector (c) being zero or nonzero. Such implementations may include using a training set to obtain p(T|f(c)) for the possible values of f(c).

In some implementations, the transform-specific probability distributions may be obtained (at 750) in accordance with, or using, pixel domain training data. The residual block (obtained at 720) includes information about the corresponding prediction reference block (obtained at 720). The quantized block (obtained at 740) may be inverse transformed using the inverse transforms for the available transforms ($N_T$) to obtain ($N_T$) respective reconstructed residual candidate blocks (collectively, a plurality of reconstructed residual block candidates). The respective likelihood of the ($N_T$) respective reconstructed residual candidate blocks matching the residual block (R) may be determined to obtain the transform corresponding to the largest likelihood. In some implementations, a transform may be identified among the two or more transforms corresponding to the largest likelihoods. Obtaining, determining, calculating, or generating, the ($N_T$) likelihoods may include using an artificial neural network (G) using the reference block (R) and the ($N_T$) candidate residual blocks as inputs, wherein a vector (L) indicates the ($N_T$) relative likelihoods, wherein $IT_0$ to $IT_{N_T}$ are the ($N_T$) candidate residual blocks obtained by performing the available, or candidate, inverse transforms on the quantized block, may be expressed as the following:

$$L = G(R, IT_0, IT_1, \ldots IT_{N_T}).$$

Transform prediction with parsing independent encoding 700 includes remapping the transform identifiers (at 760). Transform prediction with parsing independent encoding 700 may include obtaining a remapping function for remapping the transform identifiers (at 760) (transform identifier remapping function). Remapping the transform identifiers improves coding efficiency for entropy coding the transform identifiers and provides robustness to misestimated absolute values of the probabilities for the available transforms ($N_T$).

The likelihoods for the available transforms ($N_T$) are sorted in descending likelihood order. The position of a transform identifier in the sorted transform identifiers is the remapped transform identifier for the respective available transforms ($N_T$).

Remapping the transform identifiers (at 760) includes obtaining, such as by the encoder, a remapped transform identifier (t*) corresponding to the transform identifier (T*) (determined at 730) for the transform used for obtaining the transform block, wherein L(R, ITs) is a likelihood vector generated for the reference block and the transform candidates, which may be expressed as the following:

$$t^* = \text{sort}(L(R, ITs)).\text{index}(T^*).$$

Remapping the transform identifiers based on probability, or likelihood, of use concentrates the relatively probable transforms at the beginning, low value, of the list of transform identifiers, which decreases the entropy of transmitting the transform identifiers.

In some implementations, the transforms, and the corresponding transform identifiers, may be partitioned into a number, or cardinality, (K), such as two (K=2), sets, groups, or collections. Encoding a multi-ary symbol with a relatively small alphabet may be relatively efficient. For example, the transforms, and the corresponding transform identifiers, may be partitioned into a number, or cardinality, (K), such as two (K=2), sets, groups, or collections and a respective transform may be identified, or identifiable, by a transform group identifier and a transform identifier within the respective group.

In some implementations, wherein the transforms are grouped into two or more groups, remapping the transform identifiers may be performed for a respective group and the transform group identifier and the remapped transform identifier within the group may be included in the encoded bitstream (at 790), wherein remapping the transform group identifiers is omitted.

In some implementations, wherein the transforms are grouped into two or more groups, the transform group identifiers may be remapped, the transform identifiers may be remapped for a respective group, and the remapped transform group identifier and the remapped transform identifier within the group may be included in the encoded bitstream (at 790).

In some implementations, wherein the transforms are grouped into two or more groups, the transform group identifiers may be remapped and the remapped transform group identifier and the transform identifier within the group may be included in the encoded bitstream (at 790), wherein remapping the transform identifiers within the group is omitted.

The entropy coded transform identifier (transform ID) is obtained (at 770) by entropy coding the remapped transform identifier (t*).

In some implementations, remapping (at 760) may be omitted (as indicated by the broken line border at 760) and the probabilities obtained (at 760) may be used as the probability distribution for entropy coding the transform identifier, the transform group identifier, or both.

Obtaining a current block (at 715), obtaining a prediction reference block (at 720), obtaining a residual block (at 720), determining a transform (at 730), obtaining an entropy coded block (at 740), remapping (at 760), and obtaining an entropy coded transform identifier (ID) (at 770) may be performed (as indicated by the broken directional line at 775) for the respective blocks of the current frame.

The entropy coded block data for the respective blocks of the current frame may be included in the output, compressed, or encoded, bitstream (at 780).

The transform identifiers, which may be remapped transform identifiers, which may be entropy coded, for the blocks of the current frame entropy coded block data for the respective blocks of the current frame may be included in the output, compressed, or encoded, bitstream (at 790). The transform identifiers may be included in the encoded bitstream subsequent to the entropy coded block data.

Figure 8:
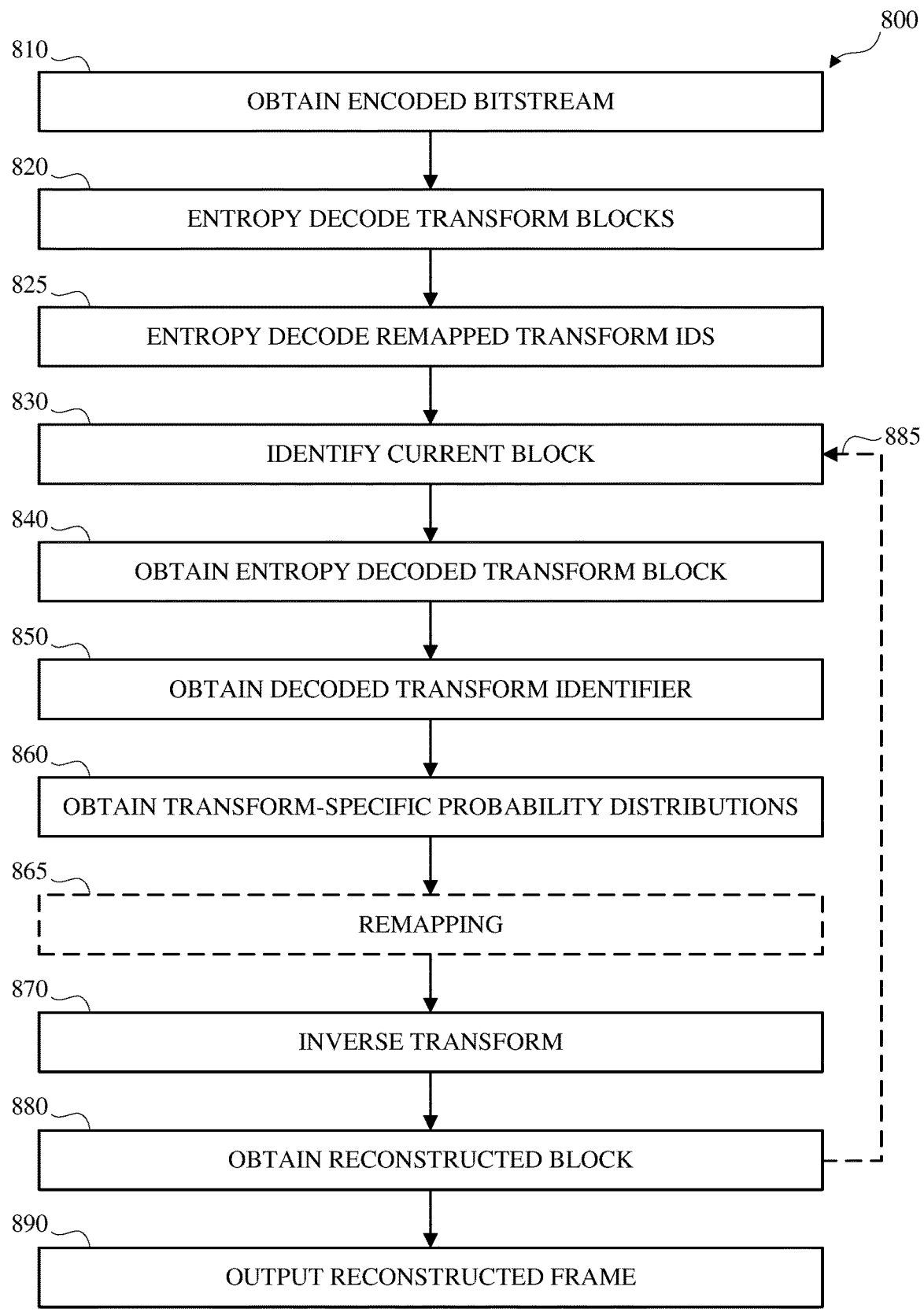
FIG. 8 is a flowchart diagram of an example of a method of transform prediction with parsing independent decoding in accordance with implementations of this disclosure.

FIG. 8 is a flowchart diagram of an example of a method of transform prediction with parsing independent decoding 800 in accordance with implementations of this disclosure. Transform prediction with parsing independent decoding 800 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. Transform prediction with parsing independent decoding 800 can be implemented as specialized hardware included, for example, in computing device 100. For example, a decoder, such as the decoder 500 shown in FIG. 5, or one or more components thereof, may implement transform prediction with parsing independent decoding 800, or one or more portions thereof.

Transform prediction with parsing independent decoding 800 includes generating a reconstructed frame (current frame) of a reconstructed video by decoding an entropy coded bitstream, or one or more portions thereof.

As shown in FIG. 8, transform prediction with parsing independent decoding 800 includes obtaining an encoded bitstream (at 810), generating a reconstructed frame by entropy decoding transform blocks (at 820), entropy decoding transform identifiers (at 825), identifying a current block (at 830), obtaining an entropy decoded transform block (at 840), obtaining a decoded transform identifier (at 850), obtaining transform-specific probability distributions (at 860), remapping (at 865), inverse transformation (at 870), and obtaining a reconstructed block (at 880), and outputting the reconstructed frame (at 890).

Transform prediction with parsing independent decoding 800 includes obtaining (at 810), receiving, or otherwise accessing, an encoded, or compressed, bitstream, such as the compressed bitstream 404 shown in FIG. 4 or the compressed bitstream 502 shown in FIG. 5, and decoding the encoded, or compressed, bitstream to generate an output video stream, such as the output video stream 504 shown in FIG. 5.

Transform prediction with parsing independent decoding 800 includes obtaining entropy decoded transform blocks (at 820) by entropy decoding the transform blocks for the current frame from the entropy coded bitstream. The transform blocks are blocks of entropy decoded transform coefficients, which may be quantized transform coefficients.

Transform prediction with parsing independent decoding 800 includes obtaining entropy decoded transform identifiers (at 825), by entropy decoding the transform identifiers for the current frame from the entropy coded bitstream. The entropy decoded transform identifiers may be remapped transform identifiers, such as the remapped transform identifier entropy coded by the encoder as shown (at 770) in FIG. 7.

In some implementations, entropy decoding the transform identifiers may be block-parsing dependent (not expressly shown). For example, entropy coding, by the encoder, of the transform identifier for a block may include conditionally entropy coding the transform identifier for the block in accordance with the transform coefficients, such as the entropy decoded transform coefficients, for the block, such as by using the transform coefficients to identify a probability distribution for entropy coding the transform identifier. Block-parsing dependent entropy coding of transform identifiers may be inefficient, or slow, relative to block-parsing independent entropy coding of transform identifiers.

In some implementations, entropy decoding the transform identifiers (at 825) is block-parsing independent, wherein entropy decoding the transform identifiers (at 825) does not depend on data from entropy decoding the transform blocks (at 820) and entropy decoding the transform blocks (at 820) does not depend on data from entropy decoding the transform identifiers (at 825).

For example, the entropy decoded transform identifiers may be entropy decoded subsequent to entropy decoding the transform blocks (at 820), which may be block-parsing independent.

In another example, the entropy decoded transform identifiers may be obtained (at 825) independently from, such as in parallel with, entropy decoding the transform blocks (at 820), which may be block-parsing independent.

A current block of the current frame is identified for decoding (at 830), such as in a block-scan order, such as forward sig-zag order.

An entropy decoded transform block (current transform block) for the current block is obtained (at 840) from the entropy decoded transform blocks (entropy decoded at 820). The entropy decoded transform block includes quantized transform coefficients. For example, the current block may be an 8×8 block, and the entropy decoded transform block may include sixty-four quantized transform coefficients. In some implementations, obtaining the entropy decoded transform block may include dequantizing the quantized transform coefficients to obtain decoded transform coefficients.

An entropy decoded transform identifier for the current block is obtained (at 850) from the entropy decoded transform identifiers (entropy decoded at 825).

The transform-specific probability distributions are obtained (at 860). Obtaining the transform-specific probability distributions (at 860), is similar to obtaining transform-specific probability distributions as shown (at 750) in FIG. 7, except as is described herein or as is otherwise clear from context. For example, obtaining the transform-specific probability distributions (at 860) includes using the entropy decoded transform block (current transform block) for the current block (obtained at 840).

The transform identifiers are remapped (at 865) to obtain remapped transform identifiers. Remapping the transform identifiers (at 865) is similar to remapping the transform identifiers as shown (at 760) in FIG. 7, except as is described herein or as is otherwise clear from context. The likelihoods for the available transforms ($N_T$) are sorted in descending likelihood order. The position of a transform identifier in the sorted transform identifiers is the remapped transform identifier for the respective available transforms ($N_T$). In some implementations, remapping the transform identifiers (at 865) includes obtaining a transform identifier remapping function (inverse remapping function) for remapping the transform identifiers (at 865).

Remapping the transform identifiers (at 865) includes obtaining the transform identifier (T*) for the current transform for inverse transforming the current block. Obtaining the transform identifier (T*) for the current transform includes determining the transform identifier (T*) from the remapped transform identifiers in accordance with the current remapped transform identifier (t*). Obtaining the transform identifier (T*) for the current transform, such as by the decoder, wherein L(R, ITs) is a likelihood vector generated for the reference block and the transform candidates in accordance with the transform-specific probability distributions (obtained at 750), may be expressed as the following:

$$T^* = sort(L(R, ITs))[t^*].$$

In some implementations, wherein the transforms are grouped into two or more groups, remapping the transform identifiers may be performed for a respective group and the transform group identifier and the remapped transform identifier within the group may be decoded from the encoded bitstream (at 825) and identified for the current block (at 850), wherein remapping the transform group identifiers is omitted.

In some implementations, wherein the transforms are grouped into two or more groups, the transform group identifiers may be remapped, the transform identifiers may be remapped for a respective group, and the remapped transform group identifier and the remapped transform identifier within the group may be decoded from the encoded bitstream (at 825) and identified for the current block (at 850).

In some implementations, wherein the transforms are grouped into two or more groups, the transform group identifiers may be remapped and the remapped transform group identifier and the transform identifier within the group may be decoded from the encoded bitstream (at 825) and identified for the current block (at 850), wherein remapping the transform identifiers within the group is omitted.

The entropy decoded transform block, or entropy decoded transform coefficients for the current block, are inverse transformed (at 870) to obtain a decoded residual block. Inverse transforming (at 870) the entropy decoded transform block includes obtaining the transform for inverse transforming the entropy decoded transform block as indicated by the transform identifier (T*) (inverse remapped transform identifier) (obtained at 865).

The decoded residual block is obtained by inverse transforming the dequantized transform block (obtained at 840) using the current transform.

A reconstructed block is obtained (at 880). Obtaining the reconstructed block includes generating a predicted block for the current block and obtaining the reconstructed block by combining the predicted block for the current block and the decoded residual block. The reconstructed block is included in the current reconstructed frame.

In some implementations, remapping (at 865) may be omitted (as indicated by the broken line border at 865) and the probabilities obtained (at 860) may be used as the probability distribution for entropy coding the transform identifier, the transform group identifier, or both.

Identifying the current block (at 830), obtaining the entropy decoded transform block (at 840), obtaining the decoded transform identifier (at 850), remapping (at 865), inverse transformation (at 870), and obtaining the reconstructed block (at 880) may be performed for the blocks of the current frame, as indicated by the broken directional line at 885.

The reconstructed frame is output (at 890), such as for storage, presentation, such as to a user, or both.

As used herein, the terms "optimal", "optimized", "optimization", or other forms thereof, are relative to a respective context and are not indicative of absolute theoretic optimization unless expressly specified herein.

As used herein, the term "set" indicates a distinguishable collection or grouping of zero or more distinct elements or members that may be represented as a one-dimensional array or vector, except as expressly described herein or otherwise clear from context.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
   obtaining an encoded bitstream;
   generating a reconstructed frame, wherein the reconstructed frame includes a plurality of blocks, wherein generating the reconstructed frame includes:
      entropy decoding, from the encoded bitstream, transform blocks for the reconstructed frame;
      entropy decoding, from the encoded bitstream, decoded transform identifiers for the transform blocks;
      obtaining transform-specific probability distributions for available transforms;
      for a current transform block from the transform blocks:
         identifying a current remapped transform identifier from the decoded transform identifiers;
         identifying a current transform identifier, wherein identifying the current transform identifier includes identifying the current transform identifier in accordance with the current remapped transform identifier, the transform coefficients from the current transform block, and the transform-specific probability distributions;
         identifying a current transform in accordance with the current transform identifier;
         inverse transforming, in accordance with the current transform, the current transform block to obtain a current residual block; and
         obtaining a current reconstructed block using the current residual block; and
      including the current reconstructed block in the reconstructed frame; and
   outputting the reconstructed frame.

2. The method of claim 1, wherein entropy decoding the decoded transform identifiers includes entropy decoding the decoded transform identifiers subsequent to entropy decoding the transform blocks.

3. The method of claim 1, wherein entropy decoding the decoded transform identifiers includes entropy decoding the decoded transform identifiers independent of entropy decoding the transform blocks.

4. The method of claim 1, wherein identifying the current transform identifier includes inverse remapping the current remapped transform identifier.

5. A method comprising:
   obtaining a current frame from an input video stream;
   obtaining an encoded frame by encoding the current frame, wherein encoding the current frame includes:
      for a current block from the current frame:
         obtaining, as a residual block, a difference between the current block and a prediction reference block obtained for coding the current block;
         determining a transform identifier of a transform, from a plurality of available transforms, for transforming the residual block;

obtaining an entropy coded block by entropy coding a transform block obtained by transforming the residual block using the transform;
including the entropy coded block in a plurality of entropy coded blocks for the current frame;
obtaining a transform-specific probability distribution trained for the transform;
obtaining an entropy coded transform identifier by entropy coding the transform identifier using the transform-specific probability distribution; and
including the entropy coded transform identifier in a plurality of entropy coded transform identifiers for the current frame;
including the plurality of entropy coded blocks in an output bitstream;
including the plurality of entropy coded transform identifiers in the output bitstream; and
outputting the output bitstream.

6. The method of claim 5, wherein obtaining the entropy coded block includes:
obtaining quantized transform coefficients by quantizing transform coefficients from the transform block; and
entropy coding the quantized transform coefficients.

7. The method of claim 5, wherein obtaining the transform-specific probability distribution includes:
generating the transform-specific probability distribution using transform domain training data.

8. The method of claim 5, wherein obtaining the transform-specific probability distribution includes:
generating the transform-specific probability distribution using pixel domain training data.

9. The method of claim 5, wherein determining the transform identifier includes determining the transform for transforming the residual block from available transforms, wherein a respective transform identifier is associated with a respective transform from the available transforms.

10. The method of claim 9, wherein obtaining the transform-specific probability distribution includes obtaining the transform-specific probability distribution in accordance with the transform block and trained statistical probability distributions for the available transforms.

11. The method of claim 10, wherein obtaining the transform-specific probability distribution includes:
obtaining updated trained statistical probability distributions for the available transforms by updating the trained statistical probability distributions in accordance with the prediction reference block.

12. The method of claim 10, wherein:
obtaining the entropy coded block includes:
obtaining quantized transform coefficients by quantizing transform coefficients from the transform block; and
entropy coding the quantized transform coefficients; and
obtaining the transform-specific probability distribution includes:
obtaining a plurality of reconstructed residual block candidates by:
for a respective transform from the available transforms:
obtaining a reconstructed residual block candidate by inverse transforming the quantized transform coefficients in accordance with the respective transform; and
including the reconstructed residual block candidate in the plurality of reconstructed residual block candidates; and
obtaining the transform-specific probability distribution output by an artificial neural network using the prediction reference block and the plurality of reconstructed residual block candidates.

13. An apparatus comprising:
a non-transitory computer-readable medium; and
a processor configured to execute instructions stored on the non-transitory computer-readable medium to:
obtain a current frame from an input video stream;
obtain an encoded frame, wherein, to obtain the encoded frame the processor executes the instructions to encode the current frame, wherein to encode the current frame the processor executes the instructions to:
for a current block from the current frame:
obtain as a residual block, a difference between the current block and a prediction reference block obtained for coding the current block;
determine a transform identifier of a transform, from a plurality of available transforms, for transforming the residual block;
obtain an entropy coded block, wherein, to obtain the entropy coded block, the processor executes the instructions to entropy code a transform block obtained by transformation of the residual block using the transform;
include the entropy coded block in a plurality of entropy coded blocks for the current frame;
obtain a transform-specific probability distribution trained for the transform;
obtain an entropy coded transform identifier, wherein to obtain the entropy coded transform identifier the processor executes the instructions to entropy code the transform identifier using the transform-specific probability distribution; and
include the entropy coded transform identifier in a plurality of entropy coded transform identifiers for the current frame;
include the plurality of entropy coded blocks in an output bitstream;
include the plurality of entropy coded transform identifiers in the output bitstream; and
output the output bitstream.

14. The apparatus of claim 13, wherein obtaining the entropy coded block includes:
obtaining quantized transform coefficients by quantizing transform coefficients from the transform block; and
entropy coding the quantized transform coefficients.

15. The apparatus of claim 13, wherein obtaining the transform-specific probability distribution includes:
generating the transform-specific probability distribution using transform domain training data.

16. The apparatus of claim 13, wherein obtaining the transform-specific probability distribution includes:
generating the transform-specific probability distribution using pixel domain training data.

17. The apparatus of claim 13, wherein determining the transform identifier includes determining the transform for transforming the residual block from available transforms, wherein a respective transform identifier is associated with a respective transform from the available transforms.

18. The apparatus of claim 17, wherein obtaining the transform-specific probability distribution includes obtaining the transform-specific probability distribution in accordance with the transform block and trained statistical probability distributions for the available transforms.

19. The apparatus of claim 18, wherein obtaining the transform-specific probability distribution includes:
  obtaining updated trained statistical probability distributions for the available transforms by updating the trained statistical probability distributions in accordance with the prediction reference block.

20. The apparatus of claim 18, wherein:
  obtaining the entropy coded block includes:
    obtaining quantized transform coefficients by quantizing transform coefficients from the transform block; and
    entropy coding the quantized transform coefficients; and
  obtaining the transform-specific probability distribution includes:
    obtaining a plurality of reconstructed residual block candidates by:
      for a respective transform from the available transforms:
        obtaining a reconstructed residual block candidate by inverse transforming the quantized transform coefficients in accordance with the respective transform; and
        including the reconstructed residual block candidate in the plurality of reconstructed residual block candidates; and
    obtaining the transform-specific probability distribution output by an artificial neural network using the prediction reference block and the plurality of reconstructed residual block candidates.

* * * * *